United States Patent [19]

Moschetti et al.

[11] 4,400,427

[45] Aug. 23, 1983

[54] SINTERED SILICON NITRIDE CERAMIC ARTICLES HAVING SURFACE LAYERS OF CONTROLLED COMPOSITION

[75] Inventors: Anthony P. Moschetti; J. Thomas Smith; Carr L. W. Quackenbush, all of Acton; Helmut Lingertat, Dorchester, all of Mass.; Vincent W. Nehring, Stillwater, Minn.

[73] Assignee: GTE Laboratories Incorporated, Waltham, Mass.

[21] Appl. No.: 333,246

[22] Filed: Dec. 21, 1981

[51] Int. Cl.³ .......................... B32B 9/04; C04B 35/58
[52] U.S. Cl. ..................................... 428/332; 428/446; 501/98; 501/152
[58] Field of Search .................... 501/98, 97; 428/332, 428/446

[56] References Cited

U.S. PATENT DOCUMENTS

| | | | |
|---|---|---|---|
| 4,234,343 | 11/1980 | Andersson | 501/98 |
| 4,285,895 | 8/1981 | Mangels et al. | 501/98 X |
| 4,323,323 | 4/1982 | Lumby et al. | 501/97 X |
| 4,323,325 | 4/1982 | Samanta et al. | 501/98 X |
| 4,336,305 | 6/1982 | Tanaka | 428/446 X |
| 4,356,136 | 10/1982 | Mangels | 501/97 X |

Primary Examiner—Helen M. McCarthy
Attorney, Agent, or Firm—Jerry F. Janssen

[57] ABSTRACT

Sintered silicon nitride-silica-yttria ceramic articles having silica-rich or yttria-rich casing layers are disclosed. The surface layers are formed by sintering precompacted bodies in a powder setter bed to produce unitary sintered bodies having surface layers in which the atom ratio of yttrium to silicon has a smooth gradient from the surface of the article to the interior body of the article.

17 Claims, 3 Drawing Figures

SINTERED SILICON NITRIDE CERAMIC ARTICLES HAVING SURFACE LAYERS OF CONTROLLED COMPOSITION

CROSS-REFERENCE TO RELATED APPLICATION

This application contains subject matter relating to matter disclosed and claimed in copending application Ser. No. 333,235 filed concurrently herewith and assigned to the present assignee.

BACKGROUND OF THE INVENTION

This invention relates to densified composite ceramic articles. More particularly, it is concerned with sintered, dense, polycrystalline silicon nitride articles having surface layers of a composition different from that of the interior body of the article.

Densified composite ceramic articles based upon silicon nitride have been the subject of considerable study. Powder mixtures predominantly comprising silicon nitride, when consolidated to densities approaching the theoretical maximum, result in the production of densified ceramic articles having desirable high temperature properties. These articles have refractory character, high temperature creep resistance, thermal shock resistance, and strength which make them ideal for many high temperature applications.

To produce densified composite ceramics from powder mixtures, three methods of consolidation generally have been employed: hot pressing, hot isostatic pressing, and so-called pressureless sintering.

Sintering is the preferred method of densifying composite ceramic articles because of both the cost and complexity of equipment needed for other methods and because of the difficulty of producing some intricately shaped ceramic articles by hot pressing or hot isostatic pressing.

Silicon nitride based ceramic articles having regions of differing density are known in the art and have generally been produced by methods which entail the bonding together of separate elements previously formed by hot pressing silicon nitride or by nitriding silicon preforms (see for example, U.S. Pat. Nos. 3,854,189; 3,885,294; 3,887,411; and 4,172,107).

SUMMARY OF THE INVENTION

In accordance with the present invention, there are provided dense, sintered, polycrystalline silicon nitride based articles having an interior body portion and a surface layer portion having different compositions. Articles of the present invention are formed by sintering a pre-formed compact in a setter bed powder mixture which controls the composition of the surface layer of the final sintered body. The resulting sintered articles are of unitary structure with the surface layer portion formed in situ during the sintering process.

The articles of this invention comprise a major phase consisting essentially of silicon nitride and a minor phase including compounds of silicon, yttrium, nitrogen, and oxygen. The atom ratio of yttrium to silicon in the minor phase of the surface layer portion of the articles differs from the atom ratio of yttrium to silicon in the minor phase of the interior body portion of the article.

In a particular embodiment of articles in accordance with the present invention, the minor phase of the surface layer portion has a lower atom ratio of yttrium to silicon than the corresponding minor phase of the interior body portion of the article. Articles in accordance with this embodiment of the invention have silicon enriched surface layers possessing enhanced resistance to oxidation over the interior body portion of the article.

In another embodiment of articles in accordance with the present invention, the minor phase of the surface layer portion has a higher atom ratio of yttrium to silicon than the corresponding minor phase of the interior body portion of the article. Articles in accordance with this embodiment of the invention have surface layers enriched with respect to yttrium possessing enhanced strength over the interior body portion of the article.

For a better understanding of the present invention, together with other and further objects, advantages, and capabilities thereof, reference is made to the following disclosure and appended claims in connection with the above-described drawing.

DESCRIPTION OF THE PREFERRED EMBODIMENTS

Figure 1:
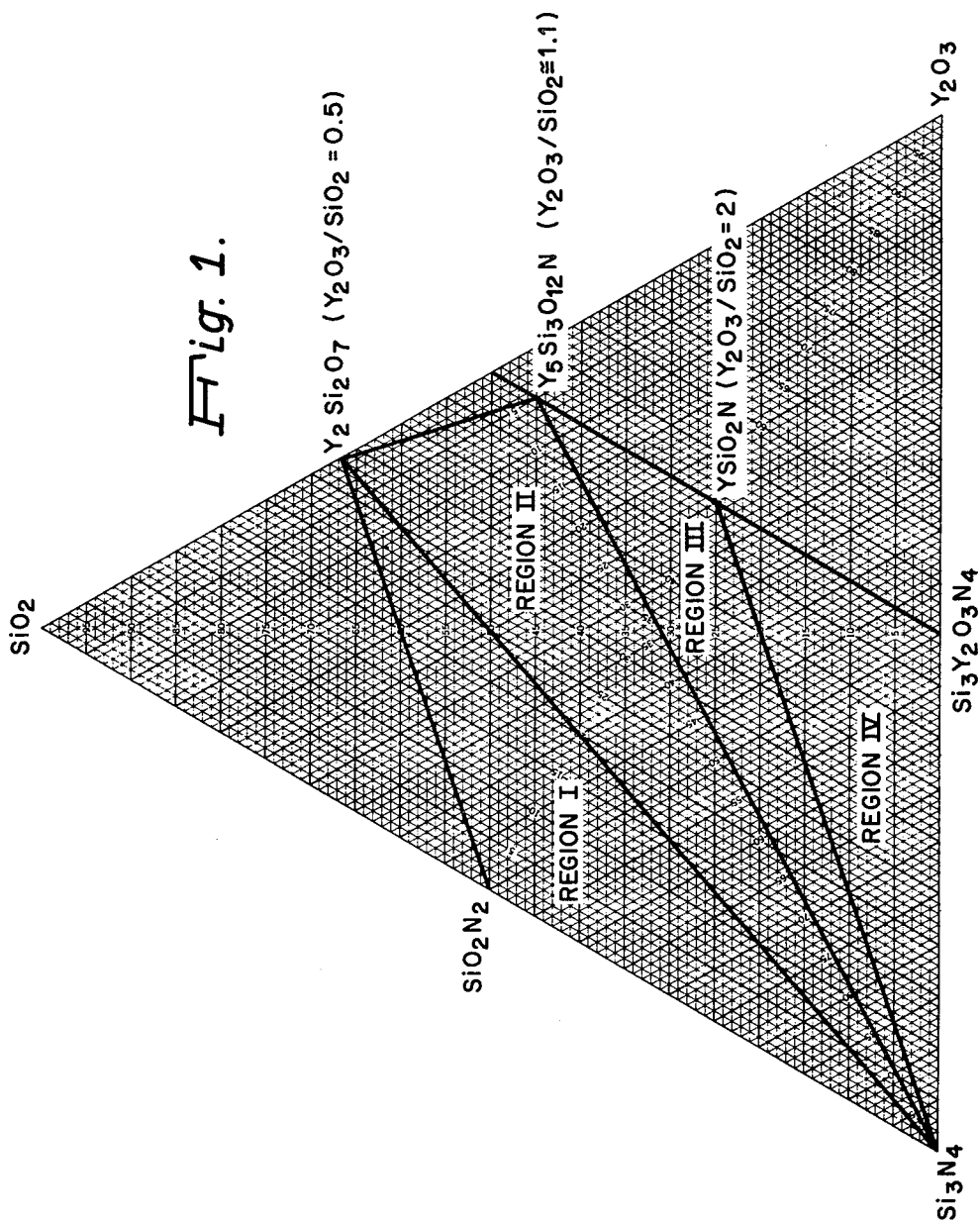
FIG. 1 is the triangular composition diagram of the silicon nitride-silicon dioxide-yttrium oxide system.

Referring to FIG. 1, there is shown the triangular mole fraction composition diagram for the silicon nitride-silicon dioxide-yttrium oxide system indicating the major compounds formed by the components of the system. Lines connecting the composition points of these compounds divide the diagram into several regions of interest which have been designated with Roman numerals.

It generally has been taught in the prior art that to fabricate ceramic compositions of silicon nitride, silicon dioxide, and yttrium oxide which are stable toward oxidation, the compositions must be restricted to regions I and II of the composition diagram. (See for example U.S. Pat. No. 4,102,698 to Lange et al.) This restriction arises due to the inclusion of easily oxidized compounds (such as $YSiO_2N$) in the final densified composite when the starting powder mixture contains relatively large amounts of $Y_2O_3$. Thus it has been taught in the prior art that, when formulating silicon nitride-silicon dioxide-yttrium oxide ceramics, compositions lying in regions III and IV of the ternary composition diagram shown in FIG. 1 are to be avoided.

However, in accordance with the present invention, there are provided silicon nitride based ceramic compositions containing yttrium oxide and silicon dioxide and which range over a wider permissible area of the $Si_3N_4$—$SiO_2$—$Y_2O_3$ composition diagram. Articles in accordance with this invention have surface layers tailored to increase their high temperature strength and/or oxidation resistance.

The articles comprise a major phase consisting essentially of silicon nitride and a minor phase consisting essentially of compounds of silicon, yttrium, nitrogen, and oxygen. The articles have a central or interior body portion having one composition of the minor phase, and a surface layer portion having a different composition for the minor phase.

Figure 2:
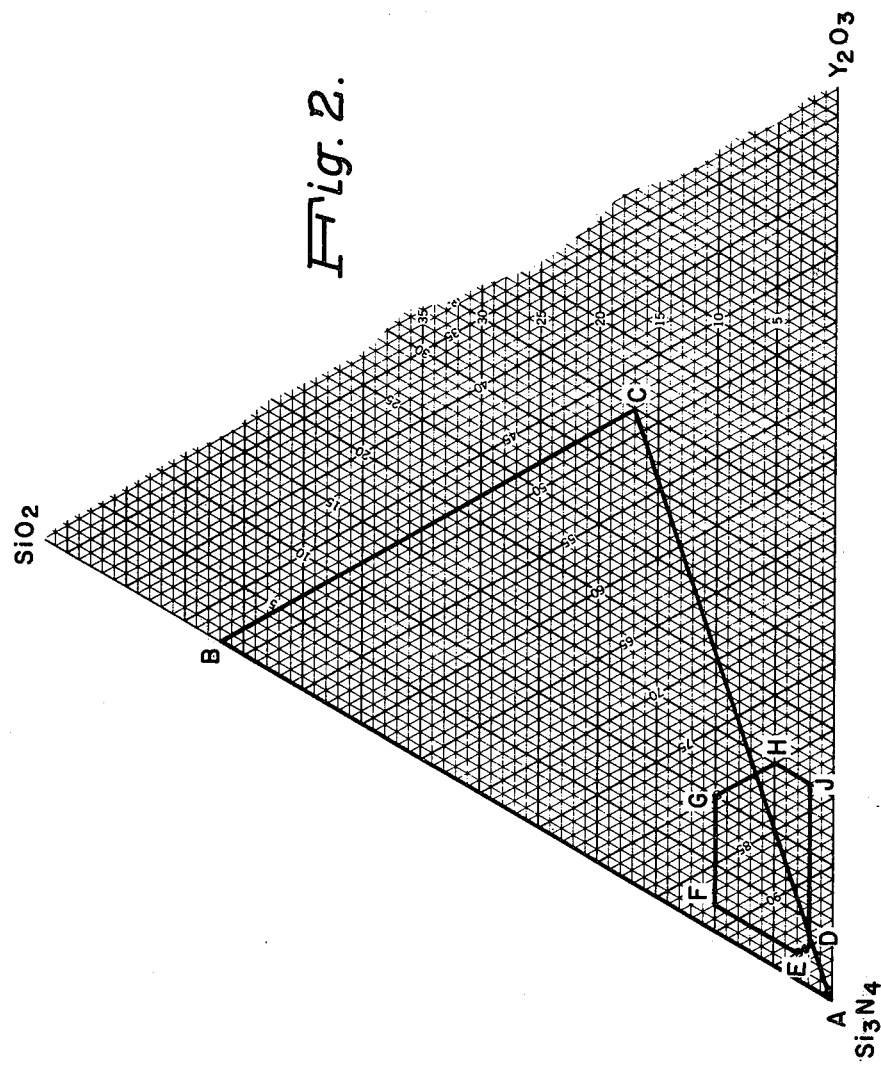
FIG. 2 is an enlarged portion of the composition diagram of FIG. 1.

Referring to FIG. 2, the preferred composition of the interior body portion of the articles of this invention lie in the region of the silicon nitride-silicon dioxide-yttrium oxide ternary composition diagram defined by the irregular hexagonal area DEFGHJ. That is, preferred compositions of the interior body portion of the articles lie within the region bounded by the iso-composition lines 80 mole percent silicon nitride and 95 mole percent silicon nitride; 2 mole percent silicon dioxide and 10 mole percent silicon dioxide; and 2 mole percent yttrium oxide and 15 mole percent yttrium oxide.

Preferred compositions of the surface layer portions of articles of this invention lie within the triangular region ABC of the ternary composition diagram of FIG. 2. That is, preferred surface layer compositions lie within the region defined by the lines zero mole percent yttrium oxide; 48 mole percent silicon nitride; and the line (AC) defining compositions having the molar ratio of yttrium oxide to silicon dioxide of about 2.

In one preferred embodiment of the invention, the overall composition of the minor phase of the surface layer portion of the article has a lower atom ratio of yttrium to silicon than the minor phase of the interior body portion of the article. The enhanced silicon content of the minor phase of the surface layer portion imparts to the article improved resistance to oxidation, particularly at higher temperatures, compared to the corresponding oxidation resistance of the composition of the interior body portion of the article. Articles in accordance with this embodiment of the invention can thus make use of the higher strength of an yttrium rich interior body portion while advantageously possessing resistance to oxidation imparted by the silicon rich casing layer on the surface of the article. The surface layer is characterized by a smooth gradient of the yttrium to silicon atom ratio from a minimum at the surface, to a maximum adjacent to the interior body portion of the article.

In another embodiment of the invention, the overall composition of the minor phase of the surface layer portion of the article has a higher atom ratio of yttrium to silicon than the minor phase of the interior body portion of the article. In this embodiment, the enhanced yttrium content of the surface layer imparts higher strength to the surface layer compared to the interior body portion. In this embodiment, the surface layer of the article is characterized by a smooth gradient of the yttrium to silicon atom ratio from a maximum at the surface of the article to a minimum adjacent to the interior body portion.

The articles of this invention are produced by sintering a pre-formed compact of silicon nitride, silicon dioxide, and yttrium oxide which is embedded in a setter bed powder mixture of the three materials. The composition of the setter bed powder mixture is chosen relative to the composition of the pre-pressed compact to tailor the surface layer composition of the final sintered body. Details of the method appear in the Examples given below, which method is disclosed and claimed in co-pending application Ser. No. 333,235 filed concurrently herewith.

Migration of material into or out of the pre-formed compact during the sintering process controls by diffusion the composition of the surface layer of the final sintered body. Since the surface layer portion of the final densified body is formed in situ during the sintering process, the final densified body is of integral or unitary structure insuring a strong and efficient bond between the surface layer portion and the interior body portion of the article. Moreover, the resulting surface layer portion possesses a smooth compositional gradient from the outer surface to the interior body portion.

To produce articles in accordance with the present invention, a finally divided powder mixture is provided containing about 80 mole percent to about 95 mole percent silicon nitride, with the balance comprising silicon dioxide and yttrium oxide. The silicon nitride may be amorphous material, amorphous material which has been partially crystallized by heat treatment, or may be a mixture of substantially completely crystalline material and substantially completely amorphous material. The average particle size of the material should range below about 3 microns, preferably below about 1 micron. A method of obtaining silicon nitride of the requisite purity, particle size and morphology has been described in detail in U.S. patent application Ser. No. 625,330, filed Oct. 23, 1975, assigned to the present assignee and now abandoned.

Silicon dioxide in amounts ranging between about 2 mole percent and about 10 mole percent of the starting powder mixture may be present as an oxide coating on the silicon nitride material, or may be added to pure silicon nitride or to silicon nitride having insufficient surface oxide in order to obtain the desired oxide composition.

Yttrium oxide in amounts of between about 2 mole percent and about 15 mole percent is added to the starting mixture of silicon nitride and silicon dioxide to act as a densification aid.

The powder mixture preferably contains less than 0.1 weight percent cation impurities, but may additionally contain small amounts (up to about 3 weight percent) of aluminum oxide to enhance sinterability.

The powder mixture is next cold pressed at pressures of about 500 psi to about 25,000 psi to form the powder mixture into a sinterable compact.

The pressed powder compact is then embedded in a setter bed powder mixture of silicon nitride, silicon dioxide, and yttrium oxide having a composition including a molar amount of silicon nitride greater than about 0.6 times the molar concentration of silicon nitride in the pre-pressed compact. To produce articles in accordance with the invention having a silicon rich surface layer, the yttrium oxide to silicon dioxide molar ratio in the setter bed powder preferably is less than about 0.35 times the corresponding molar ratio of yttrium oxide to silicon dioxide in the pressed compact.

For articles of this invention having an yttrium rich surface layer, the setter bed powder composition preferably contains a molar ratio of yttrium oxide to silicon dioxide greater than that of the pressed compact, but less than a value of about 2.

The materials employed for the formulation of the setter bed may be derived from the same sources as the materials used in formulating the powder compact.

The pressed compact and setter bed powder mixture are next heated, preferably in a nitrogen atmosphere to sinter the compact to a densified body having a density of at least 98% of theoretical, preferably greater than 99%. Sintering temperatures of between about 1400° C. and 2000° C. are chosen, depending upon the ease of sinterability of the particular compact composition chosen. Sintering times of between about 1 hour and 10 hours are effective to produce densified ceramic articles having densities in excess of 98% of theoretical.

Figure 3:
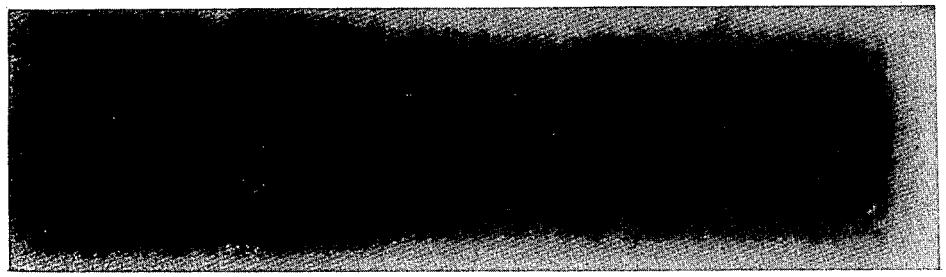
FIG. 3 is a photomicrograph of a cross-section of a densified silicon nitride ceramic article in accordance with the present invention.

FIG. 3 is a photomicrograph of a cross-section of a silicon nitride-silicon dioxide-yttrium oxide ceramic composite article in accordance with this invention (Example 2 of the Table) having an yttrium enriched surface layer. An electron microprobe analysis across the exposed face of the cross-section indicated substantially the same silicon content in both the surface layer and the interior of the article with considerably enhanced yttrium content in the surface layer.

The article illustrated in FIG. 3 has a surface layer of a thickness about 0.017 inches (0.434 mm). Preferably, the surface layer of articles of this invention are of a thickness less than about 0.05 inches (1.27 mm).

EXAMPLES

To enable one skilled in the art to practice the present invention, the following examples are provided. The examples are merely illustrative of the invention and are not to be viewed as limiting the scope of the invention as defined by the appended claims.

Unless otherwise indicated, all percentages are mole percent.

In each of the Examples 1-5 below, a mixture of silicon nitride, silicon dioxide, and yttrium oxide was thoroughly mixed by conventional ball milling methods. The mixture was then pre-pressed to form a compact which had the compositions indicated in the Table.

In each case, the pressed compact was embedded in a setter bed powder having the composition given in the Table, and sintered for 1 hour at 1400° C. and then for 4 hours at 1900° C. under nitrogen gas at a pressure of about 200 psi.

Example 1 represents an article in accordance with the embodiment of the present invention in which the article possesses a silicon-rich casing layer.

Examples 2-5 represent articles in accordance with the embodiment of the present invention in which the articles have an yttrium-rich casing layer.

Example 4 was found, upon sintering, to possess a density of 3.455 g.cm$^3$ and to have gained about 25.4% in weight. This is attributable to the migration into the surface portion of the article during sintering of heavier yttrium-containing species.

While there have been shown and described what are at present believed to be the preferred embodiments of the present invention, it will be obvious to one skilled in the art that various changes and modifications may be made therein without departing from the scope of the invention as defined by the appended claims.

TABLE

| EXAMPLE | MOLAR COMPOSITION OF COMPACT | | | MOLAR COMPOSITION OF SETTER POWDER | | | SURFACE TYPE |
|---|---|---|---|---|---|---|---|
| | A $Si_3N_4$ | B $SiO_2$ | C $Y_2O_3$ | D $Si_3N_4$ | E $SiO_2$ | F $Y_2O_3$ | |
| 1 | 90.7 | 6.80 | 2.50 | 93.2 | 6.8 | 0 | Silicon rich |
| 2 | 93.0 | 3.20 | 3.80 | 93.0 | 3.20 | 3.80 | Yttrium rich |
| 3 | 93.2 | 2.96 | 3.80 | 72.2 | 2.8 | 25.0 | Yttrium rich |
| 4 | 84.8 | 7.0 | 8.2 | 84.8 | 7.0 | 8.2 | Yttrium rich |
| 5 | 88.3 | 3.5 | 8.2 | 88.3 | 3.5 | 8.2 | Yttrium rich |

What is claimed is:

1. A unitary, sintered, polycrystalline silicon nitride based article including an interior body portion and a surface layer portion, said article comprising a major phase consisting essentially of silicon nitride and a minor phase consisting essentially of compounds of silicon, yttrium, nitrogen, and oxygen wherein the atom ratio of yttrium to silicon in said minor phase of said surface layer portion of said article differs from the atom ratio of yttrium to silicon in said minor phase of said interior body portion of said article.

2. An article in accordance with claim 1 wherein said interior body portion consists essentially of a composition lying within the region of a silicon nitride-silicon dioxide-yttrium oxide ternary composition diagram, said region bounded by the lines 80 mole percent silicon nitride and 95 mole percent silicon nitride; 2 mole percent silicon dioxide and 10 mole percent silicon dioxide; and 2 mole percent yttrium oxide and 15 mole percent yttrium oxide.

3. An article in accordance with claim 2 wherein said surface layer portion includes compositions lying within the triangular region of said ternary composition diagram, said region bounded by the lines 0 mole percent yttrium oxide, 48 mole percent silicon nitride, and the line defining the molar ratio of yttrium oxide to silicon dioxide equal to about 2.

4. An article in accordance with claim 3 wherein said atom ratio of yttrium to silicon in said surface layer portion is characterized by a smooth gradient from the surface of said article to said interior body portion of said article.

5. An article in accordance with claim 4 wherein said surface layer is of a thickness less than about 0.05 inches (1.27 mm).

6. A unitary, sintered, polycrystalline silicon nitride based article including an interior body portion and a surface layer portion, said article comprising a major phase consisting essentially of silicon nitride and a minor phase consisting essentially of compounds of silicon, yttrium, nitrogen, and oxygen wherein the atom ratio of yttrium to silicon in said minor phase of said surface layer portion of said article is less than the atom ratio of yttrium to silicon in said minor phase of said interior body portion of said article.

7. An article in accordance with claim 6 wherein said interior body portion consists essentially of a composition lying within the region of a silicon nitride-silicon dioxide-yttrium oxide ternary composition diagram, said regiom bounded by the lines 80 mole percent silicon nitride and 95 mole percent silicon nitride; 2 mole percent silicon dioxide and 10 mole percent silicon dioxide; and 2 mole percent yttrium oxide and 15 mole percent yttrium oxide.

8. An article in accordance with claim 7 wherein said surface layer portion includes compositions lying within the triangular region of said ternary composition diagram, said region bounded by the lines 0 mole percent yttrium oxide, 48 mole percent silicon nitride, and the line defining the molar ratio of yttrium oxide to silicon dioxide equal to about 2.

9. An article in accordance with claim 8 wherein said atom ratio of yttrium to silicon in said surface layer portion is characterized by a smooth gradient from a minimum at the surface of said article to a maximum adjacent to said interior body portion of said article.

10. An article in accordance with claim 9 wherein said surface layer is of a thickness less than about 0.05 inches (1.27 mm).

11. An article in accordance with claim 9 wherein said surface layer portion is characterized by enhanced resistance to oxidation over said interior body portion of said article.

12. A unitary, sintered, polycrystalline silicon nitride based article including an interior body portion and a surface layer portion, said article comprising a major phase consisting essentially of silicon nitride and a minor phase consisting essentially of compounds of silicon, yttrium, nitrogen, and oxygen wherein the atom ratio of yttrium to silicon in said minor phase of said surface layer portion of said article is greater than the atom ratio of yttrium to silicon in said minor phase of said interior body portion of said article.

13. An article in accordance with claim 12 wherein said interior body portion consists essentially of a composition lying within the region of a silicon nitride-silicon dioxide-yttrium oxide ternary composition diagram, said region bounded by the lines 80 mole percent silicon nitride and 95 mole percent silicon nitride; 2 mole percent silicon dioxide and 10 mole percent silicon dioxide; and 2 mole percent yttrium oxide and 15 mole percent yttrium oxide.

14. An article in accordance with claim 13 wherein said surface layer portion includes compositions lying within the triangular region of said ternary composition diagram, said region bounded by the lines 0 mole percent yttrium oxide, 48 mole percent silicon nitride, and the line defining the molar ratio of yttrium oxide to silicon dioxide equal to about 2.

15. An article in accordance with claim 14 wherein said atom ratio of yttrium to silicon in said surface layer portion is characterized by a smooth gradient from a maximum at the surface of said article to a minimum adjacent to said interior body portion of said article.

16. An article in accordance with claim 15 wherein said surface layer is of a thickness less than about 0.05 inches (1.27 mm).

17. An article in accordance with claim 15 wherein said surface layer portion is characterized by enhanced strength over said interior body portion of said article.

* * * * *